Feb. 27, 1968   R. W. HENES ET AL   3,371,188
ELECTRICALLY HEATED TORCH FOR ELEVATING THE TEMPERATURE
AND DIRECTING THE FLOW OF A GAS
Filed Aug. 25, 1965
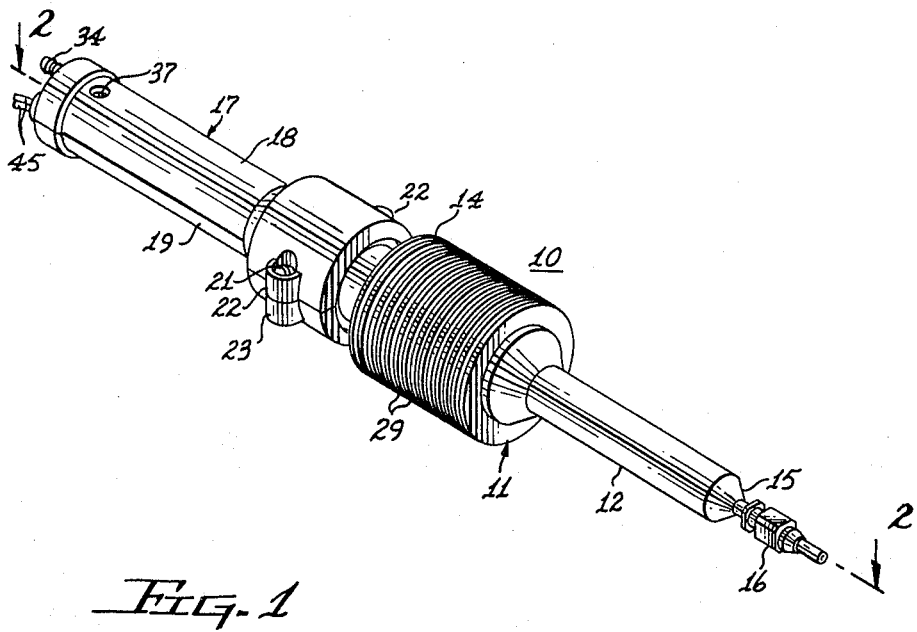
Fig. 1
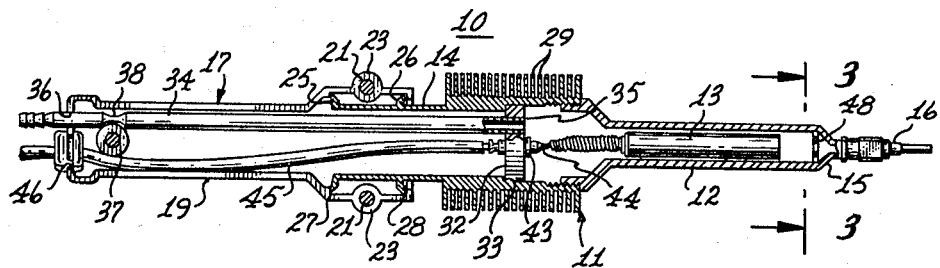
Fig. 2
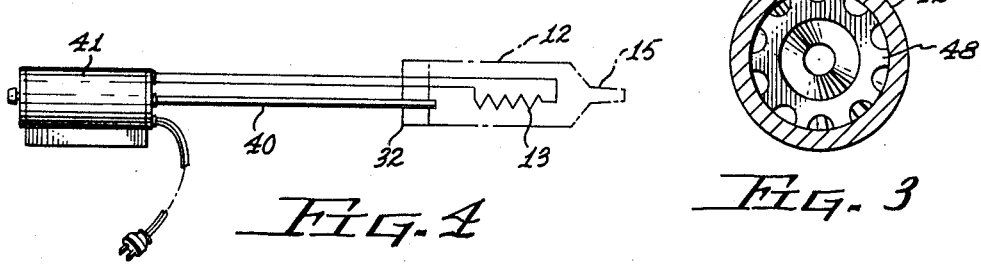
Fig. 4
Fig. 3

United States Patent Office 3,371,188
Patented Feb. 27, 1968

3,371,188
ELECTRICALLY HEATED TORCH FOR ELEVATING THE TEMPERATURE AND DIRECTING THE FLOW OF A GAS
Richard W. Henes, Phoenix, and Frithiof Nielsen, Tempe, Ariz., assignors to Henes Manufacturing Company, Inc., Phoenix, Ariz.
Filed Aug. 25, 1965, Ser. No. 482,581
4 Claims. (Cl. 219—373)

ABSTRACT OF THE DISCLOSURE

A hand held torch for elevating the temperature of and directing a concentrated stream of hot gas for heating, drying, melting, shrinking and soldering applications requiring temperatures up to 1000° F. The torch has a tubular casing having a detachable gas-jet-velocity-increasing nozzle at one end thereof. A handle is attached to the other end of the casing. A readily removable electric heater is supported within the casing near the nozzle. Heat-dissipating means are provided on the casing adjacent to the handle to keep the external temperature of the torch low enough for comfortable operator handing.

---

This invention relates to devices for elevating temperature and directing the flow of a gas and more particularly to a flameless torch for providing a concentrated stream of heated air.

Welding has been defined as the intimate union produced between the surfaces of two pieces of material when heated to the point of fusion. The essential condition to a good weld is that the plastic state of the material shall be maintained for a short time without it melting or burning away.

Some solids can be welded by pressure such as graphite, coal, asbestos, etc. and other solids such as metals by gas or arc welding. Other modern day materials such as plastics, resins, waxes and adhesives are damaged by pressure, open flame and resistance welding. Soldering irons and the like do not produce enough concentrated heat to quickly melt such materials to produce an acceptable weld.

Thus, a new welding device is needed to weld plastics, resins, waxes and the like. A device is needed to shrink thermal tubing on electrical wiring, heat epoxy adhesive to hasten curing, weld plastic parts including nylon, melt and flow solder without contacting the solder or the part by a hot iron, perform precision spot heating and the many other various heating functions needed in the manufacture of the thousands of modern day mechanical, electrical and electronic devices.

Therefore, in accordance with the invention claimed, a new and improved flameless torch is provided for the heating, drying, melting, shrinking and soldering operations requiring temperatures up to 1000 degrees Fahrenheit. This flameless torch comprises a hand held tubular casing defining within it a chamber for conducting a flow of gas therethrough. At one end of the torch is arranged a nozzle which serves to increase the velocity of the issuing jet of gas from the torch. The other end of the chamber is provided with a gas inlet for the receipt of gas under pressure. Within the chamber and preferably near the nozzle is arranged a detachably mounted resistance element which is connected to a source of electrical energy for heating the gas passing through the chamber and out of the nozzle of the torch. A protective heat dissipating radiator means is arranged around the outer periphery of the chamber between the zone of the chamber housing the resistance element and the hand grip of the torch. The radiator means dissipates the heat so that an operator may comfortably grip the torch and use it with agility even though the temperature of the gas jet issuing from the torch reaches 1000 degrees Fahrenheit or more.

It is, therefore, one object of this invention to provide a new and improved device for elevating the temperature and directing the flow of a gas.

Another object of this invention is to provide a new and improved flameless torch.

A further object of this invention is to provide a flameless torch employing a novel heat dissipating radiator which keeps the external temperature of the torch low enough for comfortable operator handling.

A still further object of this invention is to provide a new pencil like flameless torch employing detachable nozzles and electrical resistance elements and having an air supply means and which may be readily manufactured and repaired with a minimum of effort.

Further objects and advantages of our invention will become apparent as the following description proceeds and the features of novelty which characterize our invention will be pointed out with particularity in the claims annexed to and forming part of this specification.

Referring to the drawing,

FIG. 1 is a perspective view of a device for elevating the temperature and directing the flow of a gas and embodying the invention;

FIG. 2 is a cross sectional view of the structure shown in FIG. 1 taken along the lines 2—2;

FIG. 3 is a cross sectional view of the structure shown in FIG. 2 taken along the lines 3—3; and FIG. 4 is a schematic view of the device shown in FIG. 1 attached to a source of fluid under pressure.

Referring more particularly to the drawing by characters of reference, FIGS. 1–4 disclose a flameless torch 10 comprising a hollow cylindrical like chamber 11. Chamber 11 comprises a first portion 12 for housing an electrical resistance means 13 and threadedly connected into a second portion 14 which serves as a heat dissipating radiator. The first and second portions are axially aligned to provide a fluid passage longitudinally thereof. The free end of the first portion is provided with a nozzle 15 which is arranged for receiving any one of 24 assorted tips 16 which have various size openings for example, .037 inch diameter to .125 inch diameter for producing a range of velocity temperature variations of the gas issuing therefrom.

The free end of the second portion is arranged to have clamped around it a handle or handpiece 17. The handpiece 17 may comprise two moulded plastic mating parts 18 and 19 which when fitted together and clamped around the free end of the second portion form the cylindrical handle 17 for the pencil like flameless torch 10. As shown in FIG. 1 the mating parts 18 and 19 of handle 17 are held together by a pair of bolts 21. Each bolt extends through an ear 22 forming a part of part 18 and into a nut (not shown) arranged in an ear 23 forming a part of part 19.

As shown in FIG. 2 the outer surface of the second portion 14 of chamber 11 is provided with a pair of spaced flanges 25 and 26 which extend around the periphery of portion 14. These flanges are tapered so that they provide a pair of spaced ridges extending around the periphery of the chamber. Thus, when parts 18 and 19 are clamped around the free end of the second portion 14 relatively thin line surfaces 27 and 28 formed by the ridges of flanges 25 and 26 are in contact with parts 18 and 19 forming handle 17.

The outer surface of the second portion 14 of chamber 11 which is threadedly attached to the first portion 12 of chamber 11 is provided with a plurality of parallelly arranged radiator like fins 29 extending transversely of the longitudinal axis of chamber 11. These fins are provided for dissipating the heat produced by the electrical resistance means 13.

The electrical means 13 comprises a suitable resistance element or wire which is loosely arranged within the first portion 12 of chamber 11 so that gas under pressure may pass around it during its movement toward nozzle 15. This is best accomplished if the resistance element is arranged along the longitudinal axis of the chamber. In order to accomplish this the resistance element is detachably attached to an insulating disk 32 which is arranged to fit against a shoulder 33 formed in the interior surface of the second portion 14 of chamber 11. Disk 32 is arranged transversely to the longitudinal axis of portion 14 of chamber 11 and firmly held there by a gas conduit 34.

Gas conduit 34 may comprise a hollow rigid tubing which is fixedly attached to an opening 35 in disk 32. The other end of conduit 34 extends through an opening 36 formed by the mating parts 18 and 19 of handle 17.

Each of the parts 18 and 19 of handle 17 are provided with hollow cylindrical sleeves 37 which extend inwardly of the handle and abut end to end when the parts are assembled to form the handle. A bolt and nut are positioned one within each of the openings of sleeves 37 and cooperate to hold that end of the handle together. As shown in FIG. 2 the outer surface of conduit 34 is provided with an indentation 38 within which the outer surface of sleeves 37 protrude. This cooperation between the conduit and the sleeve interlocks the two parts together firmly positioning disk 32 against the shoulder 33 of the first portion 12 of chamber 11. The free end of conduit 34 protruding outwardly of handle 17 is provided with a ridged surface for firmly gripping a plastic hose 40 from a suitable source of fluid under pressure 41. As shown in FIG. 4 the source of fluid under pressure may be a gas pump electrically energized and capable of pumping, for example, air at the rate of 3 to 7 cubic feet per hour.

As shown in FIG. 2 disk 32 is provided with a pair of electrical sockets 43 for receiving in a tight frictional fit a pair of lead wires 44 of the resistance means 13. Sockets 43 protrude through disk 32 and are connected to a pair of electrical wires 45 which extend through handle 17 outwardly of an aperature 46 formed by the mating parts 18 and 19 of the handle to a suitable source of electrical power such as a 115 volt source. As shown in FIG. 4 this source of electrical power may be the same source that energizes the motor for the source of fluid under pressure 41.

FIG. 3 illustrates an apertured disk 48 which is positioned in the nozzle end of the first portion of chamber 11 between the tips 16 and the resistance means 13. This disk is intended to prevent the resistance means from moving into the nozzle and blocking it. This could happen if the resistance means is longer than shown and if its lead wires where not pushed fully into the electrical sockets in disk 32.

Although but one embodiment of the present invention has been illustrated and described, it will be apparent to those skilled in the art that various changes and modifications may be made therein without departing from the spirit of the invention or from the scope of the appended claims.

What is claimed is:
1. An article of manufacture comprising in combination a hollow cylindrical chamber, said chamber comprising a first portion having a nozzle at one end and a second portion connected to the other end of said first portion and serving as a heat dissipating radiator, said second portion defining a pair of spaced flanges extending outwardly of its periphery, a cylindrical handle surrounding and engaging said flanges, disk means mounted within and fixedly secured to said second portion, said disk means being provided with a pair of electrical sockets for frictionally receiving the terminals of a heating element, means for connecting said sockets to a source of electric power, an electrical element comprising a pair of terminals for insertion one into each of said sockets, said heating element being arranged to extend with said first portion, said disk means being apertured to permit gas to flow therethrough, and means for connecting a source of gas under pressure to said second portion for forcing gas through said disk means and past said heating element and out of said nozzle, said heating element when energized heating the gas passing through said nozzle.

2. An article of manufacture comprising in combination a hollow cylindrical chamber, said chamber comprising a first portion having a nozzle at one end and a second portion connected to the other end of said first portion and serving as a heat dissipating radiator, said radiator comprising a plurality of spaced fins extending outwardly of said chamber, said second portion defining a pair of spaced flanges extending outwardly of its periphery, a cylindrical handle made of heat insulating material surrounding and engaging said flanges, disk means mounted within and fixedly secured to said second portion, said disk means being provided with a pair of electrical sockets for frictionally receiving the terminals of said heating elements, means for connecting said sockets to a source of electric power, an electrical heating element comprising a pair of terminals for insertion into the sockets of said disk means, said heating element being arranged to extend within said first portion, said disk means being apertured to permit gas to flow therethrough, and means for connecting a source of gas under pressure to said second portion for forcing gas through said disk means past said heating element and out of said nozzle, said heating element when energized heating the gas passing through said nozzle.

3. An article of manufacture comprising in combination a hollow cylindrical chamber, said chamber comprisa first portion having a nozzle at one end and a second portion threadedly connected at one end to the other end of said first portion, said one end of said second portion serving as a heat dissipating radiator, said radiator comprising a plurality of spaced fins extending outwardly of said chamber, the other end of said second portion defining a pair of spaced flanges extending outwardly of its periphery, a cylindrical handle comprising a pair of matching parts arranged for surrounding and engaging the flanges of said second portions, means for holding said matching parts together, disk means mounted within and fixedly secured to said second portion, said disk means being provided with a pair of electrical sockets for frictionally receiving the terminals of said heating element, means for connecting said sockets to a source of electric power, an electrical heating element comprising a pair of terminals for insertion into the sockets of said disk means, said heating element being arranged to extend within said first portion, said disk means being apertured to permit gas to flow therethrough, and means for connecting a source of gas under pressure to said second portion for forcing gas through said disk means and past said heating element and out of said nozzle, said heating element when energized heating the gas passing through said nozzle.

4. An article of manufacture comprising in combination a hollow cylindrical chamber, said chamber comprising a first portion having a nozzle at one end and a second portion threadedly connected at one end to the other end of said first portion, said one end of said second portion serving as a heat dissipating radiator, said radiator comprising a plurality of spaced fins extending transversely to the longitudinal axis of said chamber, said second portion defining a pair of spaced flanges extending outwardly of its periphery at its other end, said flanges defining a pair of spaced ridges, a cylindrical handle arranged for surrounding and engaging the flanges of said second portion, disk means mounted within and fixedly secured to said one end of said second portion and extending transversely to the longitudinal axis of said chamber, said disk means being provided with a pair of electrical sockets for frictionally receiving the terminal of said heating element, means for connecting said sockets to a source of electric power, an electrical heating element comprising a pair of terminals for insertion into the sockets of said disk means, said heating element being arranged to extend within said first portion, said disk means being apertured to permit gas to flow therethrough, and pipe means extending through said second portion and connected to said disk means for connecting a source of gas under pressure to said chamber for forcing gas under pressure through said disk means past said heating element and out of said nozzle, said heating element when energized heating the gas passing through said nozzle.

References Cited
UNITED STATES PATENTS

| | | | |
|---|---|---|---|
| 1,832,899 | 11/1931 | Frederics | 219—371 X |
| 2,212,294 | 8/1940 | McMurray | 219—379 |
| 3,094,606 | 6/1963 | Ferris | 219—375 X |
| 742,305 | 11/1903 | Gerhart | 219—381 |
| 750,038 | 1/1904 | Shoenberg | 219—380 |
| 1,988,827 | 1/1935 | Bennett | 219—236 |
| 2,730,609 | 1/1956 | Constantinesco | 219—381 |
| 2,778,919 | 1/1957 | Vicario | 219—381 |
| 2,859,327 | 11/1958 | Kaminsky | 219—375 X |
| 2,951,927 | 9/1960 | Weller | 219—239 X |
| 3,047,050 | 7/1962 | Suurber | 156—497 |

ANTHONY BARTIS, *Primary Examiner.*